US008690404B2

(12) United States Patent
Konishi et al.

(10) Patent No.: US 8,690,404 B2
(45) Date of Patent: Apr. 8, 2014

(54) HEADLAMP LED LIGHTING DEVICE AND HEADLAMP (75) Inventors: Keiko Konishi, Hyogo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 13/266,227

(22) PCT Filed: Sep. 9, 2009

(86) PCT No.: PCT/JP2009/004459
§ 371 (c)(1),
(2), (4) Date: Oct. 25, 2011

(87) PCT Pub. No.: WO2011/030375
PCT Pub. Date: Mar. 17, 2011

(65) Prior Publication Data
US 2012/0044711 A1    Feb. 23, 2012

(51) Int. Cl.
*B60Q 1/04* (2006.01)
(52) U.S. Cl.
USPC ............... 362/538; 362/507; 362/249.02
(58) Field of Classification Search
USPC ............... 362/507, 538, 548, 545, 249.02
See application file for complete search history.

(56) References Cited

U.S. PATENT DOCUMENTS

| | | | | |
|---|---|---|---|---|
| 6,142,657 A * | 11/2000 | Hinich et al. | ............... | 362/515 |
| 6,467,941 B1 * | 10/2002 | Miyata et al. | ............... | 362/519 |
| 7,165,871 B2 * | 1/2007 | Takeda et al. | ............... | 362/538 |
| 7,261,448 B2 * | 8/2007 | Ishida et al. | ............... | 362/507 |
| 7,806,575 B2 * | 10/2010 | Willwohl et al. | ........... | 362/547 |
| 7,905,639 B2 * | 3/2011 | Luo et al. | ..................... | 362/487 |
| 2002/0067617 A1 * | 6/2002 | Imachi et al. | ............... | 362/507 |
| 2004/0233678 A1 | 11/2004 | Ishida et al. | | |
| 2005/0237760 A1 | 10/2005 | Tsukamoto et al. | | |
| 2006/0239022 A1 * | 10/2006 | Inaba et al. | ................. | 362/538 |
| 2008/0266892 A1 * | 10/2008 | Yashiki et al. | ............... | 362/546 |

FOREIGN PATENT DOCUMENTS

| | | |
|---|---|---|
| JP | 3-101805 U | 10/1991 |
| JP | 7-249305 A | 9/1995 |
| JP | 8-017207 A | 1/1996 |
| JP | 2001-101924 A | 4/2001 |
| JP | 2004-349130 A | 12/2004 |
| JP | 2005-243407 A | 9/2005 |
| JP | 2005-310584 A | 11/2005 |
| JP | 2006-302712 A | 11/2006 |
| JP | 2007-207528 A | 8/2007 |
| JP | 2009-031050 A | 2/2009 |

* cited by examiner

*Primary Examiner* — Peggy A. Neils
(74) *Attorney, Agent, or Firm* — Birch, Stewart, Kolasch & Birch, LLP.

(57) ABSTRACT

Disclosed is a headlamp LED lighting device including: a box 10 for accommodating a circuit board on which a circuit for lighting LEDs 130 is mounted, the box being fitted into and mounted to a rear opening 110*b* of a headlamp case 110; a first connector 40 which is disposed on a side of the box 10 fitted into and mounted to the rear opening 110*b*, the side facing towards an inside of the headlamp case 110, for connecting to the circuit board, and which is connected to the LEDs 130, for supplying electric power to the LEDs; and a second connector 50 disposed on another side of the box 10 fitted into and mounted to the rear opening 110*b*, for connecting to the circuit board and for supplying electric power to the circuit board, the other side facing towards an outside of the headlamp case 110.

17 Claims, 10 Drawing Sheets

HEADLAMP LED LIGHTING DEVICE AND HEADLAMP

FIELD OF THE INVENTION

The present invention relates to a headlamp LED lighting device used for, for example, a vehicle, and a headlamp.

BACKGROUND OF THE INVENTION

Although LEDs or a halogen bulb is used as a light source for a headlamp for vehicle use, for example, LEDs which are a next-generation light source are still expensive compared with halogen bulbs. Therefore, for example, for the same car model having the same body, one of expensive LEDs and a cheap halogen bulb is selectively used according to the grade. Because the space and mounting structure for mounting a headlamp are the same in the case of the same car model, and it is desirable to make it possible to select only a light source and optical members and make them mountable, and provide commonality of a headlamp case and wirings in the body between the two types of headlamps. However, under the present circumstances, a headlamp case used for a halogen bulb and a headlamp case used for LEDs are used for headlamps for vehicle use.

Because a halogen bulb is a relatively short-life consumable part and therefore needs to be exchanged, an opening for exchanging a halogen bulb is disposed in a rear portion of the headlamp case. Furthermore, because a large optical member is used for a headlamp having a halogen bulb as a light source, the headlamp case is formed in such a way as to have a long length in an optical axis direction. On the other hand, because a halogen bulb does not have to have any lighting device because it uses a battery as a DC power supply to be able to light up, a halogen bulb does not have to have any members other than a member for power connection, and therefore a tire house is placed close to a rear side of the headlamp case and very narrow space is provided between the rear side of the headlamp case back and the car body. For example, patent references 1 to 3 disclose headlamps each having a halogen bulb as a light source. The headlamp according to patent reference 1 is constructed in such a way that in a rear opening of a headlamp case for exchange of a halogen bulb, a ring-shaped waterproof cover is disposed closely between a socket of a halogen bulb and a headlamp case to prevent water from permeating into the headlamp case. Furthermore, the headlamp according to patent reference 2 is constructed in such a way that a stop protruding edge and a slit are respectively formed in and mounted to a socket of a halogen bulb and a headlamp case so that the adhesion is improved while the waterproof performance is improved. Furthermore, the headlamp according to patent reference 3 includes a blocking member for blocking a rear opening for exchange of a halogen bulb in a headlamp case.

An LED has a long life and does not have to be exchanged, but needs to have a lighting device for making the LED light up and uses a headlamp case for exclusive use in which the lighting device is arranged. Furthermore, a connector for supplying electric power to the LED, and a connector for inputting electric power from a battery disposed outside the headlamp are disposed in the lighting device. Because there is no space for installing the connectors outside the headlamp case, the connectors are disposed inside the headlamp case together with the main part of the lighting device, and a wiring from each connector is connected to the LED or the battery via an opening formed in the headlamp case. For example, patent reference 4 discloses a structure of a headlamp having LEDs as a light source in which a headlamp case used for LEDs having a short length in the longitudinal direction of a vehicle body includes a rear opening which can be opened and closed.

RELATED ART DOCUMENT

Patent Reference

Patent reference 1: Japanese Patent Application Publication No Hei 7-249305
Patent reference 2: Japanese Patent Application Publication No. Hei 8-17207
Patent reference 3: Japanese Patent Application Publication No. 2001-101924
Patent reference 4: Japanese Patent Application Publication No. 2007-207528

As mentioned above, a problem with the above-mentioned conventional technologies is that a headlamp having a halogen bulb as a light source and a headlamp having LEDs as a light source cannot share a headlamp case with each other.

The present invention is made in order to solve the above-mentioned problem, and it is therefore an object of the present invention to provide a headlamp LED lighting device and a headlamp which are constructed in such a way as to share a headlamp case used for a halogen bulb with halogen bulbs.

SUMMARY OF THE INVENTION

In accordance with the present invention, there is provided a headlamp LED lighting device mounted to a rear opening of a headlamp case, for lighting a headlamp LED, including: a box for accommodating a circuit board on which a circuit for lighting the headlamp LED is mounted, the box being fitted into and mounted to the rear opening of the headlamp case; a first connector disposed on a side of the box fitted into and mounted to the rear opening, the side facing towards an inside of the headlamp case, for connecting to the circuit board, and connected to the headlamp LED, for supplying electric power to the headlamp LED; and a second connector disposed on another side of the box fitted into and mounted to the rear opening, for connecting to the circuit board and for supplying electric power to this circuit board, the other side facing towards an outside of the headlamp case.

Because the headlamp LED lighting device in accordance with the present invention is constructed in such a way that the box is fitted into the rear opening of the headlamp case and is mounted to the headlamp case, the first connector for connecting to the LED is disposed on the side of the box which faces the inside of the headlamp case, and the second connector for connecting to the electric power supply is disposed on the other side of the box which faces the outside of the headlamp case, the rear opening of the headlamp case which is originally used as the one having a halogen bulb as a light source can be blocked, and the lighting device can be inserted into the rear opening. As a result, there is provided an advantage of being able to also use the headlamp case which is originally used as the one having a halogen bulb as a light source as the headlamp case having an LED as a light source.

BRIEF DESCRIPTION OF THE FIGURES

FIG. 5(a) shows a cantilever spring, FIG. 5(b) shows a folded spring, FIG. 5(c) shows a combination of two folded springs, and FIG. 5(d) shows a coil spring;

FIG. 6(a) is a view showing a state in which the headlamp LED lighting device is inserted into a headlamp case, and FIG. 6(b) is a view showing a state in which the headlamp LED lighting device is secured to the headlamp case;

EMBODIMENTS OF THE INVENTION

Hereafter, in order to explain this invention in greater detail, the preferred embodiments of the present invention will be described with reference to the accompanying drawings.

Embodiment 1.

Figure 1:
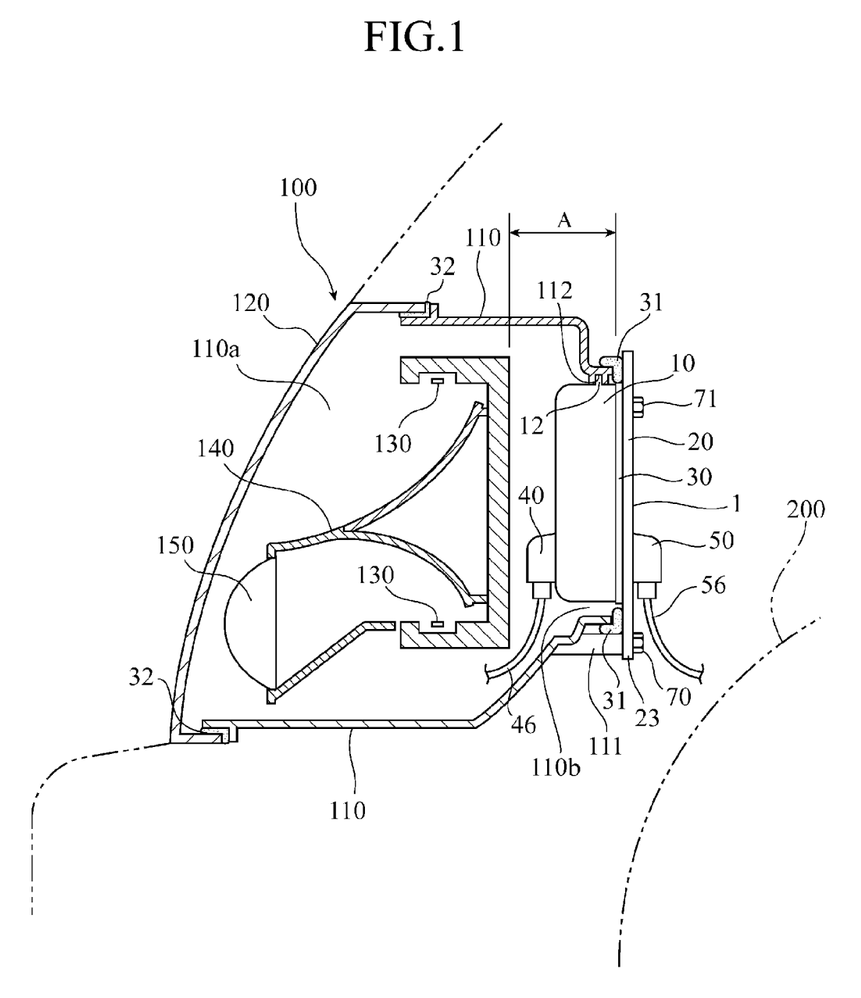
FIG. 1 is a view showing a headlamp LED lighting device and a headlamp in accordance with Embodiment 1.

An LED lighting device 1 is comprised of a box 10 for accommodating a circuit board, a mounting plate 20, a waterproof member 30, a first connector 40, and a second connector 50 when it is roughly divided into components, as shown in FIG. 1. The LED lighting device controls a power supply voltage inputted thereto via a second connector 50, and supplies appropriate electric power to LEDs 130 as a headlamp light source via the first connector 40.

The box 10 accommodates the circuit board on which a circuit for controlling the power supply voltage for lighting the LEDs 130 is arranged, and the mounting plate 20 blocks the whole of one side of an opening of the box 10 via a waterproof member 30 and holds the box. The waterproof member 30 is placed between the box 10 and the mounting plate 20.

The first connector 40 is arranged on the box 10 to connect to the circuit board in the box 10 which will be mentioned below, while the first connector is connected to the LEDs 130 disposed in the headlamp case 110 via a wiring 46 to supply electric power to the LEDs 130. The second connector 50 is arranged on the mounting plate 20 opposite to the first connector 40, and is connected to the circuit board in the box 10 which will be mentioned below while the second connector is connected to a not-shown external power supply via a wiring 56 and supplies electric power to the circuit board from, for example, a vehicle-mounted battery.

Engagement protruding portions 12 for mounting the LED lighting device 1 to the headlamp case 110 are formed on the box 10. A fixing part 23 for preventing unexpected rotation of the LED lighting device 1 is formed on the mounting plate 20. A screw 70 secures the mounting plate 20 to the headlamp case 110 in such a way that the LED lighting device 1 is prevented from rotating after the LED lighting device 1 is mounted to the headlamp case 110. Screws 71 secure the box 10, the mounting plate 20, and the waterproof member 30 to one another.

The detailed structure of the LED lighting device 1 will be mentioned later.

Next, the headlamp case 110 to which the LED lighting device 1 in accordance with Embodiment 1 is mounted will be explained. As shown in FIG. 1, an opening 110a (front opening) is formed in a front portion of the headlamp case 110, and an opening 110b (rear opening) is formed in a rear portion of the headlamp case 110. The rear opening 110b is formed in the shape of a substantially circle. A boss 111 and engaging recesses 112 are disposed close to the rear opening 110b, and a not-shown screw hole is formed in the boss 111.

A front lens 120 is inserted into the headlamp case 110 in such a way as to cover the front opening 110a. A waterproof member 32 is disposed between the headlamp case 110 and the front lens 120 and is constructed so that water does not permeate into the headlamp case from the front surface of the headlamp case. Furthermore, in the headlamp case 110, the LEDs 130 as a light source, and a reflector 140 and a lens 150 as optical members are disposed.

The rear opening 110b of the headlamp case 110 is opened in such a way as to extend in a substantially horizontal direction, and the LED lighting device 1 is mounted to the rear opening 110b in such a way as to be placed in a substantially vertical direction. The box 10 of the LED lighting device 1 is inserted and fitted into the rear opening 110b of the headlamp case 110 and is mounted to the rear opening in such a way as to block the rear opening 110b of the headlamp case 110. The mounting plate 20 of the LED lighting device 1 is mounted to the rear opening 110b of the headlamp case 110 in such a way as to block the rear opening 110b of the headlamp case 110. At this time, the first connector 40 is disposed on a side of the box 10 fitted into and mounted to the rear opening 110b, the side of the box facing towards an inside (front side) of the headlamp case 110, and the second connector 50 is disposed on another side of the box 10 fitted into and mounted to the rear opening 110b, the other side of the box facing towards an outside (rear side) of the headlamp case 110.

A waterproof member 31 is disposed between the mounting plate 20 and the headlamp case 110 of the LED lighting device 1, and is constructed in such a way that water does not permeate into the headlamp case 110 from the rear opening 110b.

Figure 10:
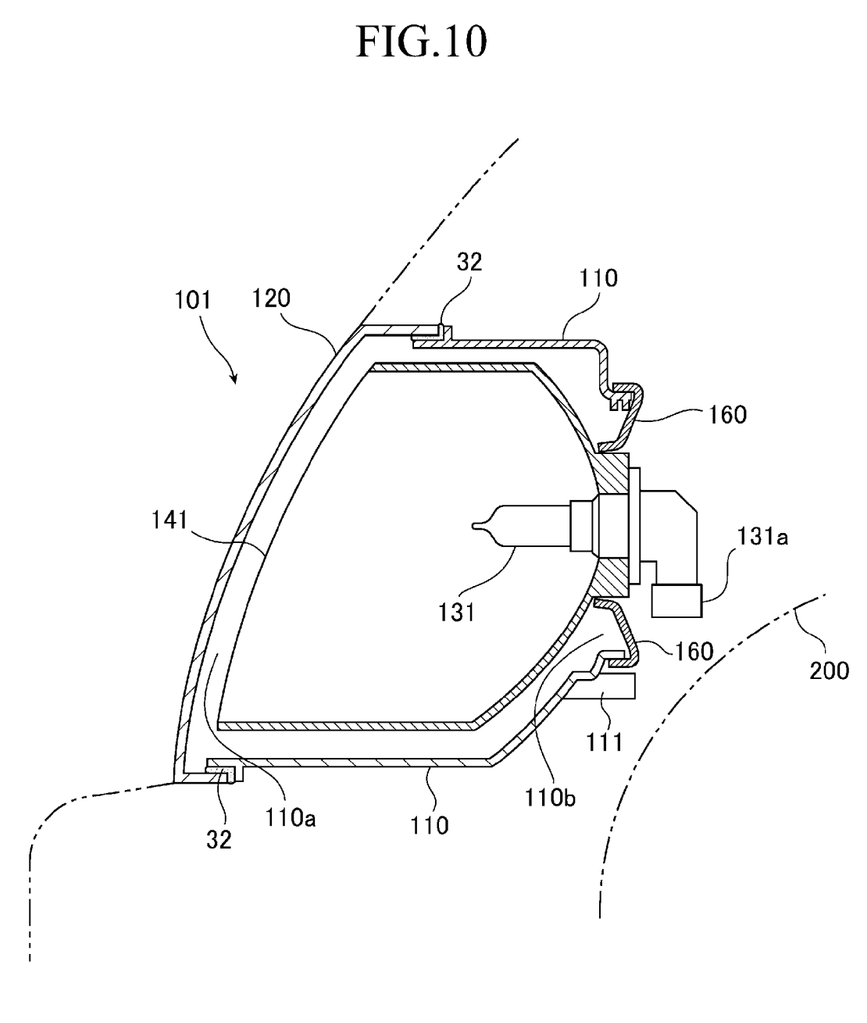
FIG. 10 is a view showing a headlamp having a halogen bulb as a light source.

The structure of a headlamp 100 having the LEDs 130 as a light source, and that of a headlamp 101 having a halogen bulb 131 as a light source will be explained with reference to FIGS. 1 and 10. As shown in FIG. 10, the halogen bulb 131 and a reflector 141 are mounted and disposed in the headlamp case 110 in the headlamp 101, and the halogen bulb 131 and the reflector 141 are larger than the LEDs 130 and the reflector 140 shown in FIG. 1. Furthermore, in the vicinity of the back of either of the headlamps 100 and 101, a tire house 200 is placed, as shown in FIGS. 1 and 10, and the LED lighting device 1 cannot be placed behind the back of either of the headlamps 100 and 101. In contrast, as shown in FIG. 1, in the headlamp 100, the LEDs 130 and the reflector 140 are small compared with the halogen bulb 131 and the reflector 141, and there is space A in the rear portion of the headlamp case 110.

Therefore, the LED lighting device 1 in accordance with Embodiment 1 is constructed in such a way that a part of the LED lighting device 1 is arranged in the space A which is provided by the use of the LEDs 130 as shown in FIG. 1, thereby making it possible to share the headlamp case 110 with halogen headlamps, and either the LEDs 130 and the optical members, and the LED lighting device 1, or the halogen bulb 131 and the optical members can be selectively mounted in the single headlamp case 110.

Figure 2:
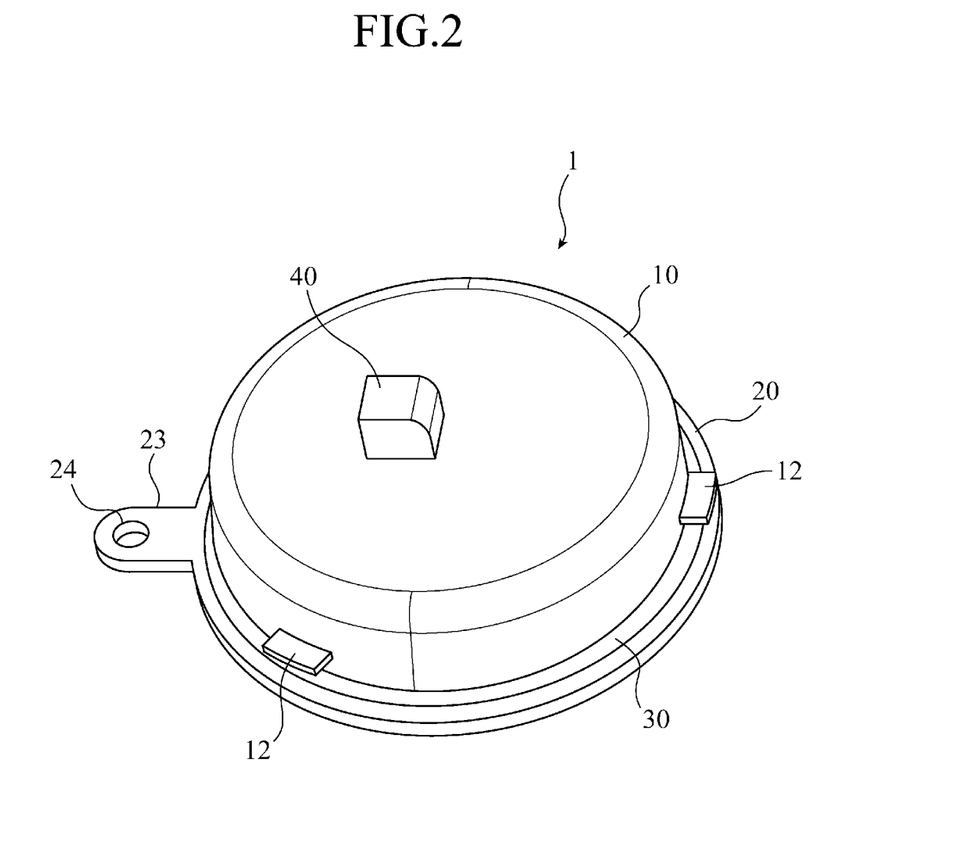
FIG. 2 is a whole perspective view showing the headlamp LED lighting device in accordance with Embodiment 1.

Next, the detailed structure of the LED lighting device 1 will be explained. FIG. 2 is a perspective view showing the structure of the external appearance of the LED lighting device 1. The box 10 is formed in a cylindrical shape as shown in FIG. 2, and is made from, for example, a resin. The box 10 is formed in such a way as to have a diameter which is slightly smaller than that of the above-mentioned rear opening 110b of the headlamp case 110 shown in FIG. 1, and is fitted into the rear opening 110b in such a way as to block the rear opening 110b. The LED lighting device 1 is fitted into the headlamp case 110 while being guided in a direction of insertion by the box 10 when inserted into the headlamp case, so that the LED lighting device can be mounted to the headlamp case. The LED lighting device 1 is constructed in this way in such a way that it becomes easy to mount the LED lighting device 1 to the headlamp case 110, and the workability of the mounting is improved.

The engagement protruding portions 12 are formed integrally on the outer peripheral portion of the box 10. The engagement protruding portions 12 are formed in such a way as to be enagageable with the above-mentioned engaging recesses 112 of the headlamp case 110 of FIG. 1. When the LED lighting device 1 is rotated as will be mentioned later, the box 10 and the headlamp case 110 are locked together. Thus, because the engagement protruding portions 12 are formed integrally on the outer peripheral portion of the box 10, no special additional cost occurs. Furthermore, the first connector 40 is formed integrally on an upper surface of the box 10.

Figure 3:
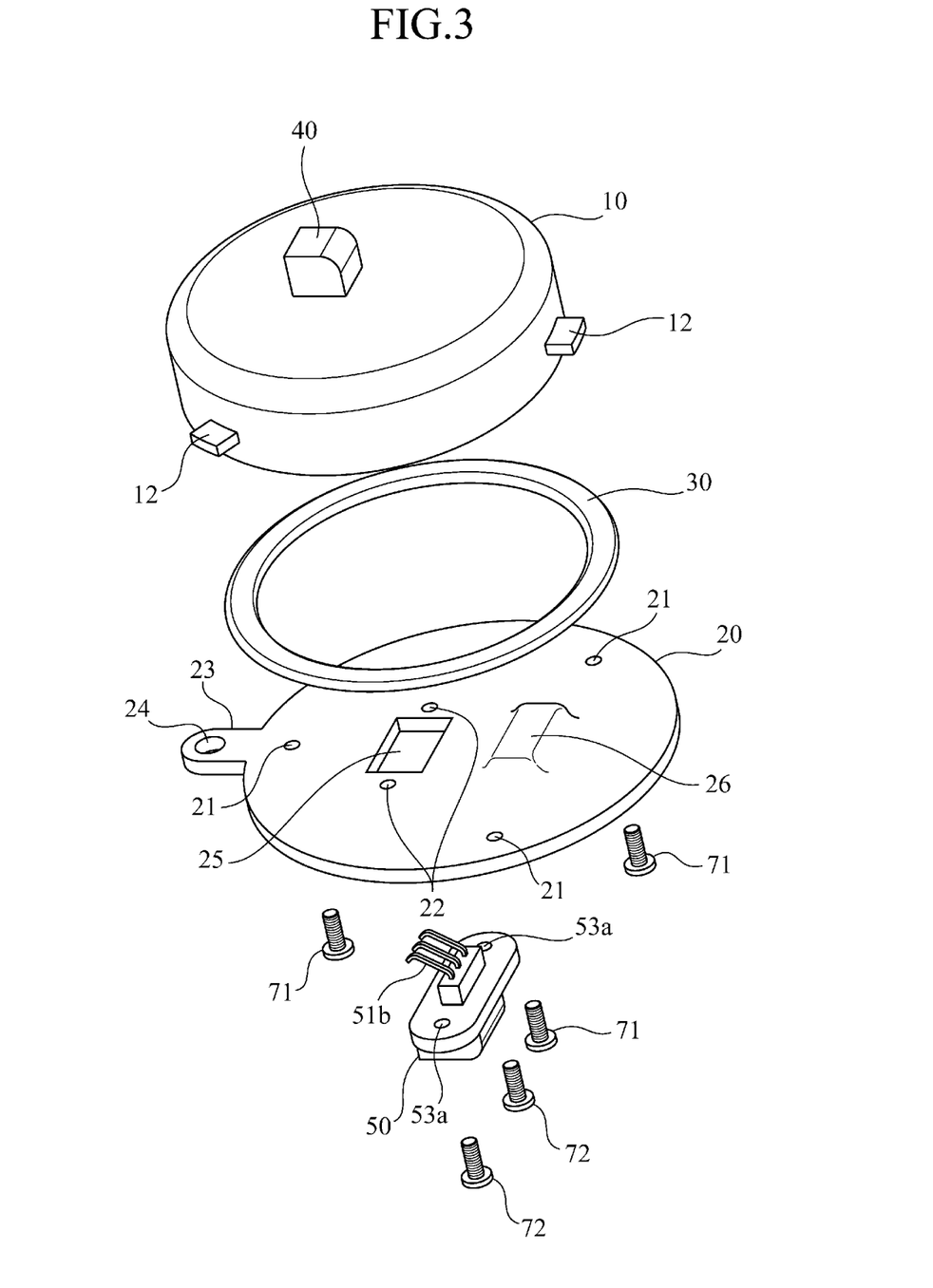
FIG. 3 is an exploded perspective view showing the structure of the headlamp LED lighting device in accordance with Embodiment 1.

FIG. 3 is an exploded perspective view of the LED lighting device 1. The mounting plate 20 is shaped like a flat disc having a substantially circular cross section, as shown in FIG. 3, and is formed in such a way as to have a diameter larger than that of the above-mentioned rear opening 110b of the headlamp case 110 of FIG. 1. The fixing part 23 is disposed on the outer peripheral portion of the mounting plate 20, and a screw hole 24 is formed in the fixing part 23. Furthermore, screw holes 21, screw holes 22, an opening 25, and a heat transferring part 26 are formed in the mounting plate 20, as shown in FIG. 3. The screw holes 21 are used to mount the box 10 to the mounting plate 20, and the screw holes 22 and the opening 25 are used to mount the second connector 50 to the mounting plate 20. The heat transferring part 26 will be mentioned later.

As shown in FIG. 3, the LED lighting device 1 is assembled by inserting contact terminals 51b of the second connector 50 into the opening 25 of the mounting plate 20, screwing screws 72 into the screw holes 53a of the second connector 50, and the screw holes 22 of the mounting plate 20, putting the waterproof member 30 between the box 10 and the mounting plate 20 to place the waterproof member between them, and then screwing screws 71 into the screw holes 21 of the mounting plate 20 to connect and secure this mounting plate to the box.

Figure 4:
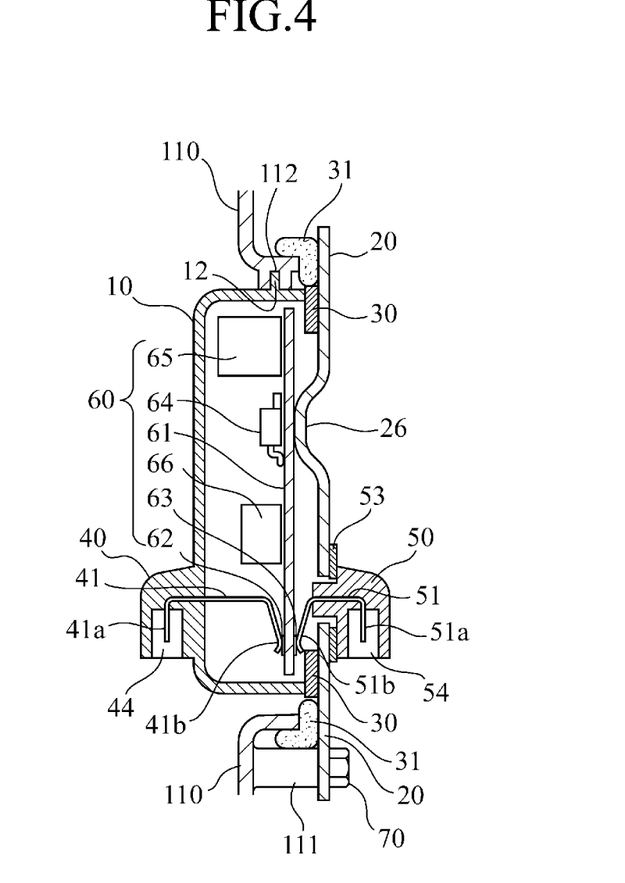
FIG. 4 is a partially cutaway view of the headlamp LED lighting device in accordance with Embodiment 1.

FIG. 4 is a partially cutaway longitudinal cross sectional view of the LED lighting device 1. As shown in FIG. 4, the circuit board 60 is disposed within the box 10. The circuit board 60 is comprised of a board 61, electrodes 62 and 63, an FET (Field effect transistor) 64, electronic parts 65 and 66, and so on, and controls the power supply voltage to supply the electric power having an appropriate voltage to the LEDs 130. The electrodes 62 and 63 for connection are formed on the front and rear surfaces of the board 61, and the FET 64, the electronic parts 65 and 66, and so on are secured to the board 61 with other circuit electrodes.

The mounting plate 20 is made from a material having higher thermal conductivity than the box 10, and the heat transferring part 26 which is bent and formed in such a way as to protrude toward the box 10 is disposed on the mounting plate 20. The heat transferring part 26 is in contact with a hot part of the board 61. The box 10 is formed by press-working a resin and the mounting plate 20 is formed by press-working an aluminum plate, for example, and the heat transferring part 26 is constructed in such a way as to propagate heat which is generated on the circuit board 60 to the mounting plate 20 and the mounting plate 20 is constructed in such a way as to function as a heat sink (radiating member). Because the heat transferring part and the mounting plate are constructed in this way, the heat dissipation efficiency is improved and the reliability of the LED lighting device 1 is improved.

The waterproof member 30 mentioned above prevents water from permeating into the box 10, and the waterproof member 31 prevents water from permeating into the headlamp case 110. The waterproof members 30 and 31 are O rings each of which is formed of an elastic material. The waterproof members 30 and 31 are not limited to O rings, and each of them can be anything having a waterproofing effect, such as an adhesive, a sealing compound, a seal adhesive, or a packing.

An electrical conduction line 41 is disposed in the first connector 40, and the electrical conduction line 41 has a connector terminal 41a at an end thereof and a contact terminal 41b at another end thereof. The connector terminal 41a is disposed in an outer portion of the LED lighting device 1, and the contact terminal 41b is disposed inside the box 10 of the LED lighting device 1. An opening 44 of a connector housing enclosing the connector terminal 41a is formed in the first connector 40 in such a way as to face downwardly.

The second connector 50 is arranged at a position opposite to that of the first connector 40, and is mounted to the mounting plate 20 via a waterproof member 53. An electrical conduction line 51 is disposed in the second connector 50, and the electrical conduction line 51 has a connector terminal 51a at an end thereof and a contact terminal 51b at another end thereof. The connector terminal 51a is disposed in an outer portion of the LED lighting device 1, and the contact terminal 51b is disposed inside the box 10 of the LED lighting device 1. An opening 54 of a connector housing enclosing the connector terminal 51a is formed in the second connector 50 in such a way as to face downwardly. Furthermore, the waterproof member 53 of the second connector 50 is made from a material having elasticity, and has a waterproof function of preventing water from permeating into the box 10.

Each of the contact terminal 41b of the first connector 40 and the contact terminal 51b of the second connector 50 is formed in such a way as to have spring properties. The contact terminals 41b and 51b press and is into contact with opposite positions of the electrodes 62 and 63 formed on the front and rear surfaces of the circuit board 60, respectively. Furthermore, the portions of the contact terminals 41b and 51b which are in contact with the electrodes 62 and 63 of the circuit board 60 are given tinning, for example. The shape of each of the contact terminals 41b and 51b having spring properties will be mentioned later.

The opening 44 of the first connector 40 and the opening 54 of the second connector 50 are disposed in such a way as to face downwardly, and are constructed in such a way that even though water reaches either of the above-mentioned wirings 46 and 56 of FIG. 1, water is prevented from permeating into the box 10.

Figure 5:
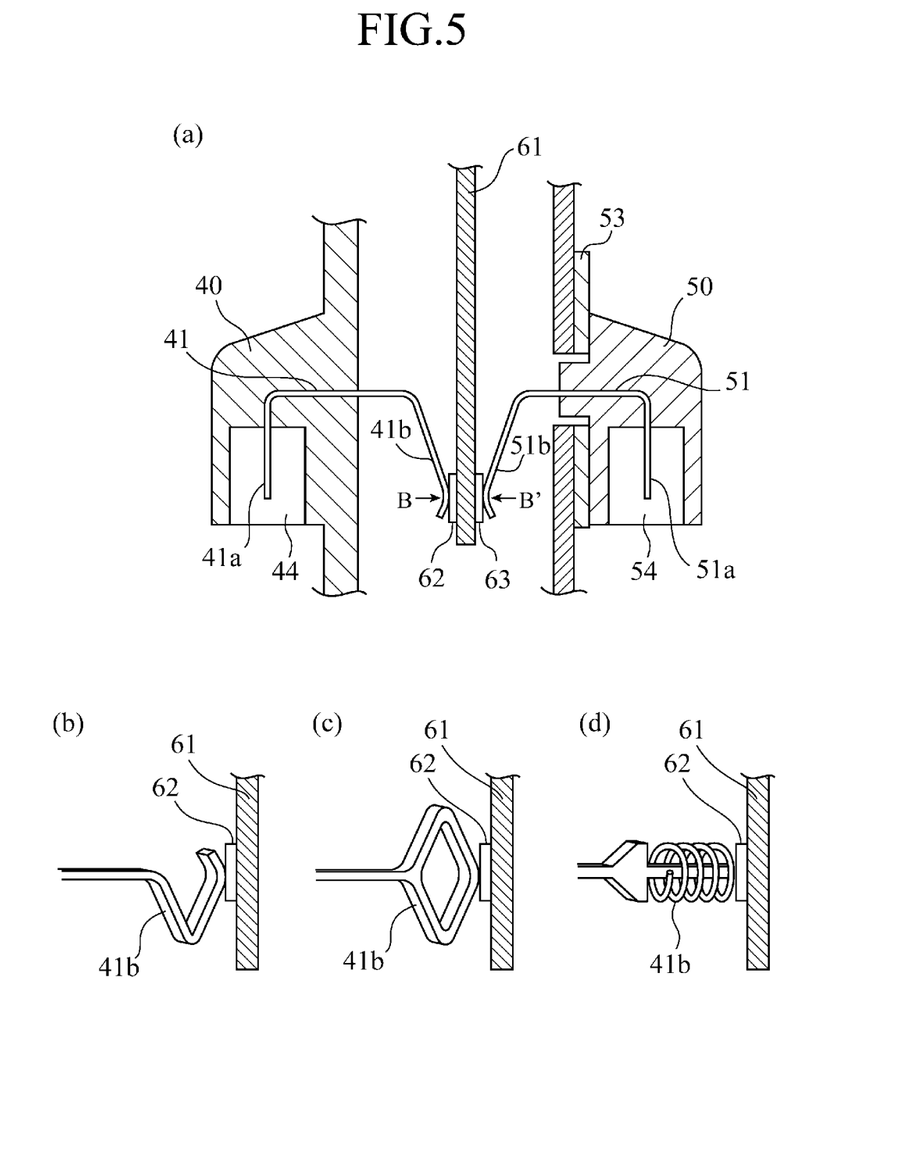
FIG. 5 is a partially enlarged view explaining the shape of a contact terminal of the headlamp LED lighting device in accordance with Embodiment 1.

Hereafter, the shape of each of the contact terminals 41b and 51b will be explained. FIG. 5 is a partially enlarged view for explaining the shape of each of the contact terminals 41*b* and 51*b* of the first connector 40 and the second connector 50.

Each of the contact terminals 41*b* and 51*b* is formed in the shape of, for example, a cantilever spring by bending a portion extending from a midpoint to an end of each of the electrical conduction lines 41 and 51 substantially in the shape of the letter L, as shown in FIG. 5(*a*). The contact terminals 41*b* and 51*b* which are constructed in this way are pressed in directions shown by arrows B and B' shown in FIG. 5(*a*) in such a way as to be brought into contact with the electrodes 62 and 63 on the board 61 at the opposite positions, and are electrically connected to the board via the electrodes 62 and 63.

The shape of each of the contact terminals 41*b* and 51*b* is not limited the cantilever spring shape as shown in FIG. 5(*a*), and each of the contact terminals has only to be formed in such a way as to be pressed in the directions shown by the arrows B and B' shown in FIG. 5(*a*). For example, the above-mentioned cantilever spring shape of each of the contact terminals 41*b* and 51*b* can be further folded back to shorten its beam part in such a way that each of the contact terminals is formed in the shape of a folded spring as shown in FIG. 5(*b*). As an alternative, each of the both sides of an end portion of each of the contact terminals can be given a folded spring shape to double the pushing pressure in such a way that each of the contact terminals is formed in the shape of a combination of two folded springs as shown in FIG. 5(*c*). As an alternative, a coil spring is arranged around the end portion of each of the contact terminals 41*b* and 51*b* in such a way that each of the contact terminals is formed in the shape of a coil spring as shown in FIG. 5(*d*).

Figure 6:
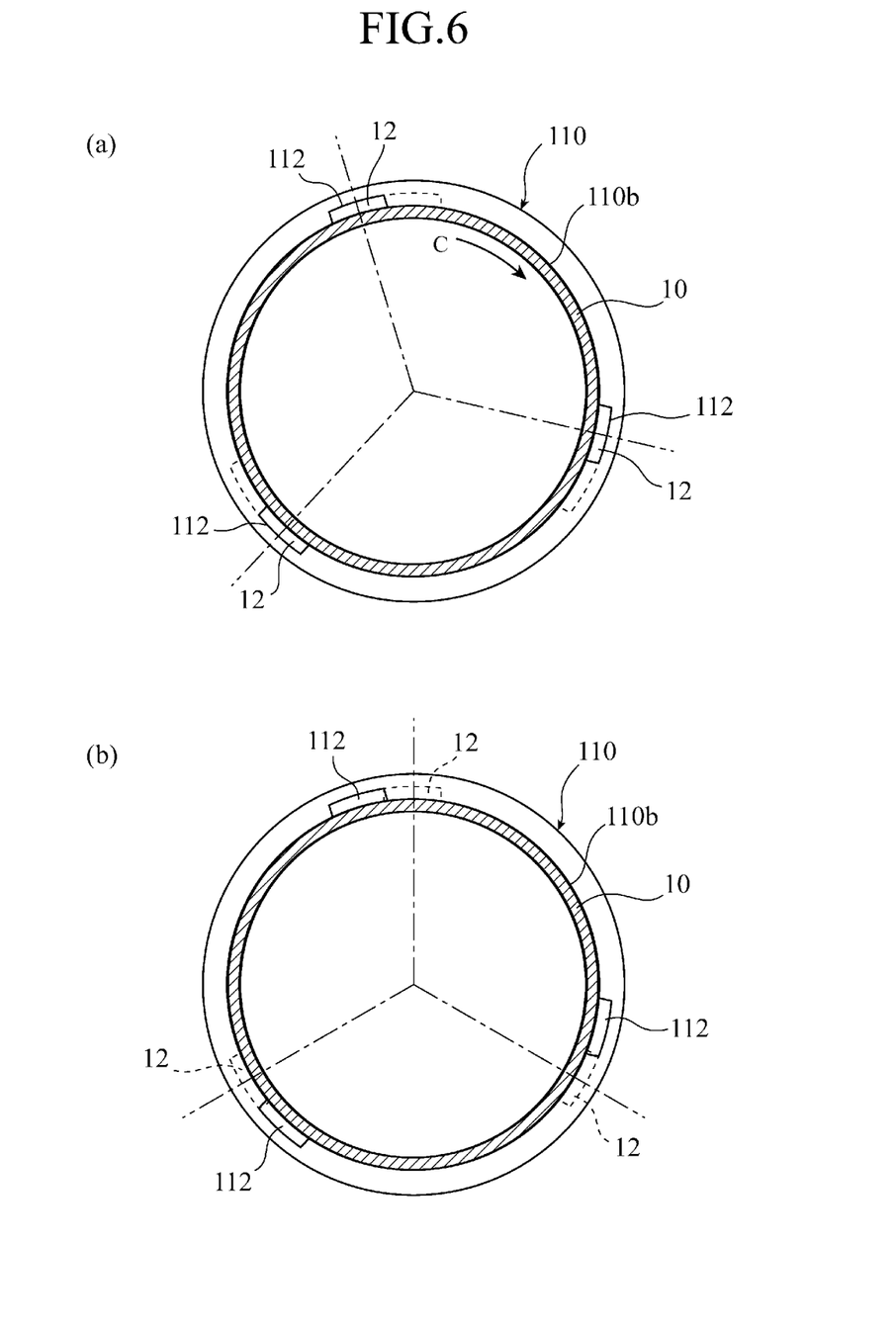
FIG. 6 is a view explaining how to mount the headlamp LED lighting device in accordance with Embodiment 1.

Next, how to mount the LED lighting device 1 in accordance with Embodiment 1 to the headlamp case 110 will be explained. FIG. 6(*a*) is a view showing a state in which the LED lighting device 1 is inserted into the headlamp case 110, and FIG. 6(*b*) is a view showing a state in which the LED lighting device 1 is secured to the headlamp case 110 after rotated in a direction of C.

When inserting the box 10 of the LED lighting device 1 into the rear opening 110*b* of the headlamp case 110 so that the box is fitted into the headlamp case, the engagement protruding portions 12 of the box 10 are inserted in the engaging recesses 112 of the headlamp case 110, as shown in FIG. 6(*a*). When twisting the box 10 in the direction of the arrow C shown in FIG. 6(*a*) slightly to rotate the box, the engagement protruding portions 12 disposed on the LED lighting device 1 are locked by the engaging recesses 112 disposed on the headlamp case 110 and formed in the peripheral edge of the rear opening 110*b* of the headlamp case 110, as shown in FIG. 6(*b*), and the headlamp case 110 and the LED lighting device 1 are secured to each other with respect to an axis direction. By securing the above-mentioned fixing part 23 shown in FIG. 1 and the boss 111 to each other with the screw 70, the LED lighting device 1 is prevented from rotating in the opposite direction and becoming demounted from the headlamp case. Thus, the LED lighting device 1 is constructed in such a way as to be easily mountable to the headlamp case.

As mentioned above, the LED lighting device in accordance with Embodiment 1 is constructed in such a way that the box 10 is fitted into and mounted to the rear opening 110*b* formed in a rear portion of the headlamp case 110, the first connector 40 for connecting to the LEDs 130 is disposed on a side of the box 10, the side facing towards an inside of the headlamp case 110, and the second connector 50 for connecting to the electric power supply is disposed on another side of the box 10, the other side facing towards an outside of the headlamp case 110, the box 10 of the LED lighting device 1 can be accommodated in the headlamp case 110 and anything except the second connector 50 of the LED lighting device 1 does not protrude from the rear surface of the connector headlamp case 110. As a result, there is provided an advantage of being able to use the headlamp case 110 used for a headlamp having a halogen bulb as a light source as the headlamp case 110 used for the headlamp having the LEDs 130 as a light source. Furthermore, by sharing the headlamp case 110 with halogen headlamps, the number of operations is reduced in the headlamp manufacturing process for the same car model and the productivity is improved while the management of the volume of production and stock of products becomes easy.

In addition, because any soldering for connecting the connectors to the board is not carried out, the productivity of the LED lighting device is improved.

Furthermore, in accordance with Embodiment 1, because the mounting plate 20 is formed in such a way as to have a diameter larger than that of the rear opening 110*b* of the headlamp case 110, the mounting plate 20 can block the rear opening 110*b* of the headlamp case 110.

Embodiment 2.

Although in Embodiment 1 the structure in which the LED lighting device 1 is secured to the headlamp case by making the engagement protruding portions 12 formed on the outer peripheral portion of the box 10 be engaged with the engaging recesses 112 of the headlamp case 110 is explained, a structure in which an LED lighting device 1 is mounted to a headlamp case 110 by securing them to each other by screws will be explained in Embodiment 2.

Figure 7:
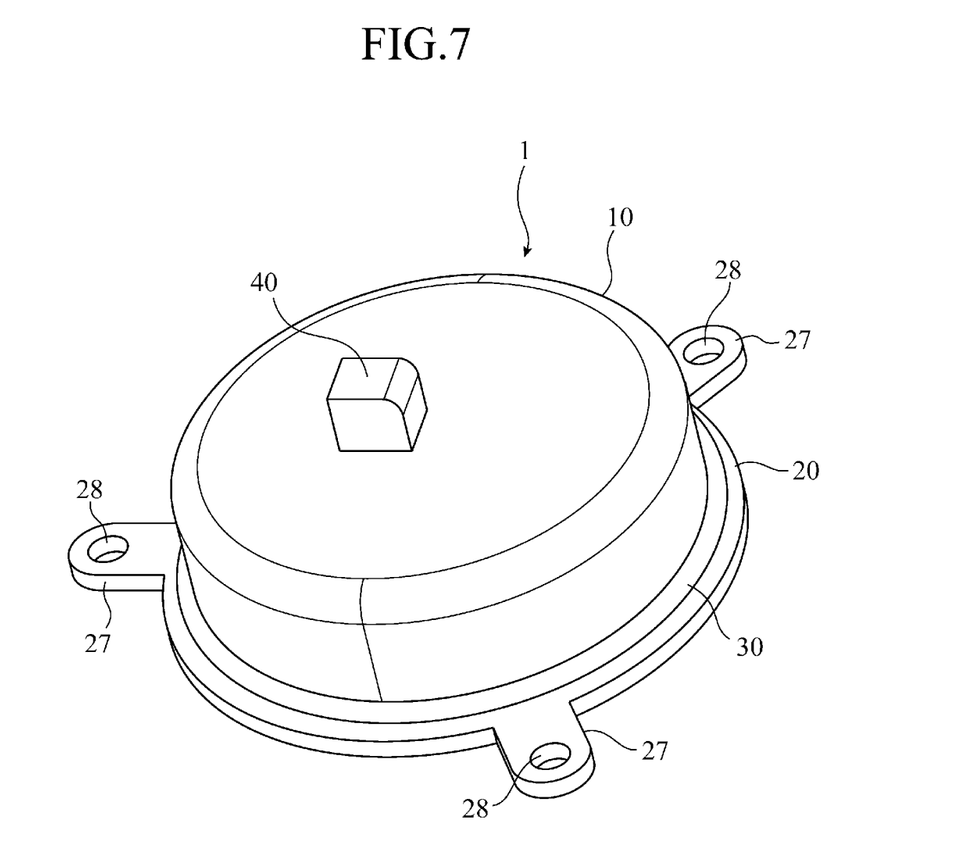
FIG. 7 is a whole perspective view showing a headlamp LED lighting device in accordance with Embodiment 2.
Figure 8:
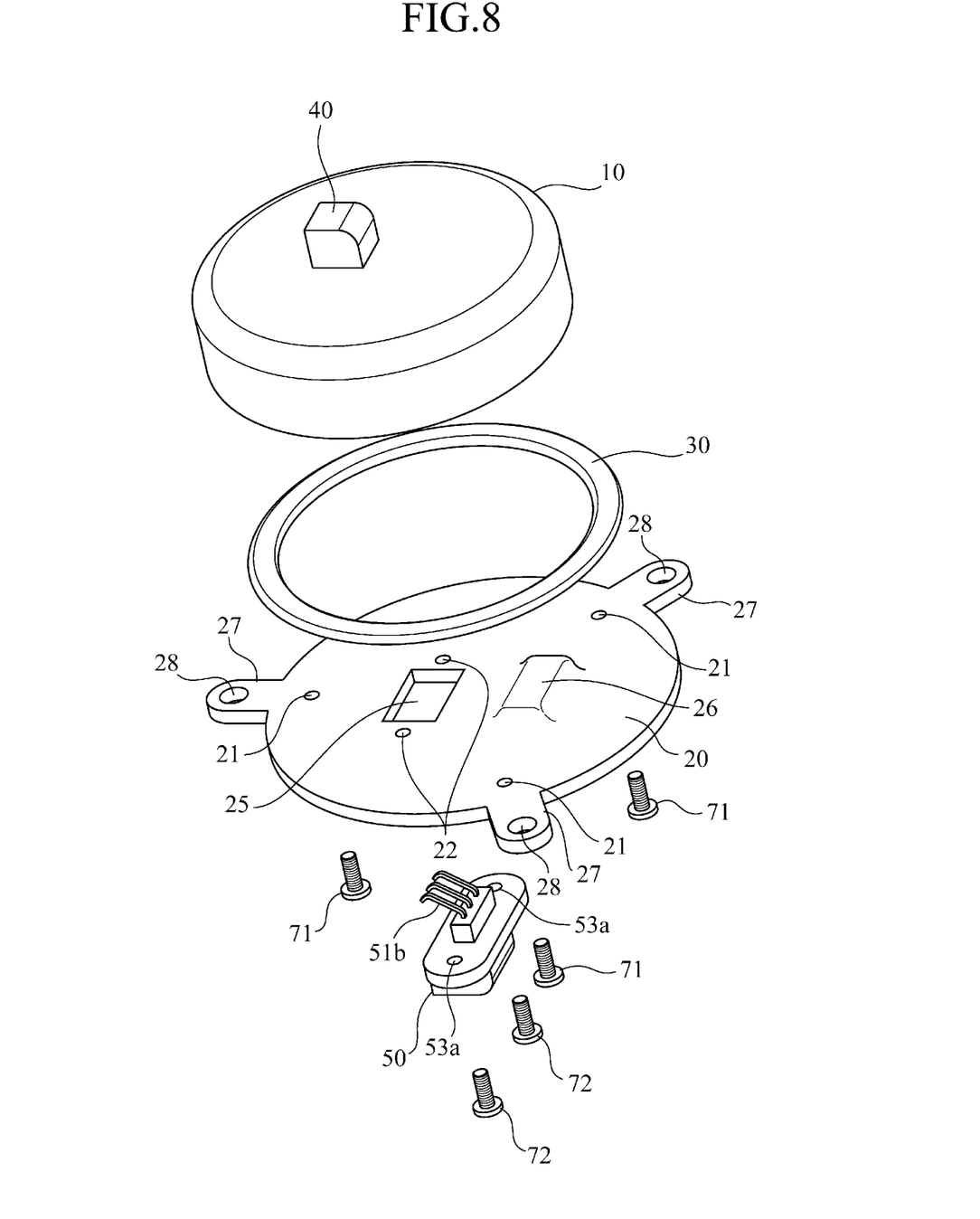
FIG. 8 is an exploded perspective view showing the structure of the headlamp LED lighting device in accordance with Embodiment 2.

FIG. 7 is a perspective view showing the whole of the LED lighting device 1 in accordance with Embodiment 2, and FIG. 8 is an exploded perspective view showing the LED lighting device 1 in accordance with Embodiment 2. The same components as those in accordance with Embodiment 1 are designated by the same reference numerals, and the explanation of the components will be omitted hereafter.

The LED lighting device 1 is comprised of a box 10 for accommodating a circuit board, a mounting plate 20, a waterproof member 30, a first connector 40, and a second connector 50 when it is roughly divided into components, as shown in FIGS. 7 and 8, and the mounting plate 20 blocks an opening of the box 10 via the waterproof member 30 and holds the box.

The mounting plate 20 is shaped like a flat disc having a substantially circular cross section, as shown in FIGS. 7 and 8, and a plurality of fixing parts 27 are disposed on an outer peripheral portion of the mounting plate 20 and a screw hole 28 is formed in each of the fixing parts 27. Furthermore, screw holes 21, screw holes 22, and an opening 25 are formed in the mounting plate 20, as shown in FIG. 8. The screw holes 21 are used to mount the box 10 and the mounting plate 20 to each other, and the screw holes 22 and the opening 25 are used to mount the second connector 50 to the mounting plate 20.

As shown in FIG. 8, the LED lighting device 1 is assembled by inserting contact terminals 51*b* of the second connector 50 into the opening 25 of the mounting plate 20, screwing screws 72 into the screw holes 53*a* of the second connector 50, and the screw holes 22 of the mounting plate 20, putting the waterproof member 30 between the box 10 and the mounting plate 20, and then screwing screws 71 into the screw holes 21 of the mounting plate 20 to connect and secure this mounting plate to the box.

Instead of the above-mentioned engaging recesses 112 shown in FIG. 1 of Embodiment 1, a plurality of bosses 111 are disposed on an edge portion of the rear opening 110*b* of the headlamp case 110. The bosses 111 are arranged in such a way as to correspond to the fixing parts 27 formed on the mounting plate 20 of the LED lighting device 1, respectively, and each of them has a not-shown screw hole.

Next, how to mount the LED lighting device 1 in accordance with Embodiment 2 to the headlamp case 110 will be explained. The box 10 of the LED lighting device 1 is inserted into the rear opening 110b of the headlamp case 110 in such a way as to be fitted into the rear opening, the mounting plate 20 of the LED lighting device 1 is pressed against an open end of the rear opening 110b of the headlamp case 110 in a vertical direction, and screws 70 are screwed into the screw holes 28 of the fixing parts 27, and the bosses 111 of the headlamp case 110, so that the box is secured to the headlamp case by the screws.

As mentioned above, in accordance with Embodiment 2, because the LED lighting device 1 can be pressed against and mounted to the headlamp case 110 by using the plurality of screws, the same advantages as those provided by Embodiment 1 can be offered.

The mounting plate 20 can be constructed in such a way as to include a heat transferring part 26, like that in accordance with Embodiment 1, though the explanation of the heat transferring part is omitted in Embodiment 2.

Embodiment 3.

Although in Embodiment 1 the structure in which the waterproof member 30 prevents water from permeating into the LED lighting device 1, and the waterproof member 31 prevents water from permeating into the headlamp case 110 is explained. In Embodiment 3, a structure in which a waterproof member 30 and a waterproof member 31 are integral with each other, and the internal pressure of a headlamp case 110 is made to be equal to that of an LED lighting device 1 will be explained.

Figure 9:
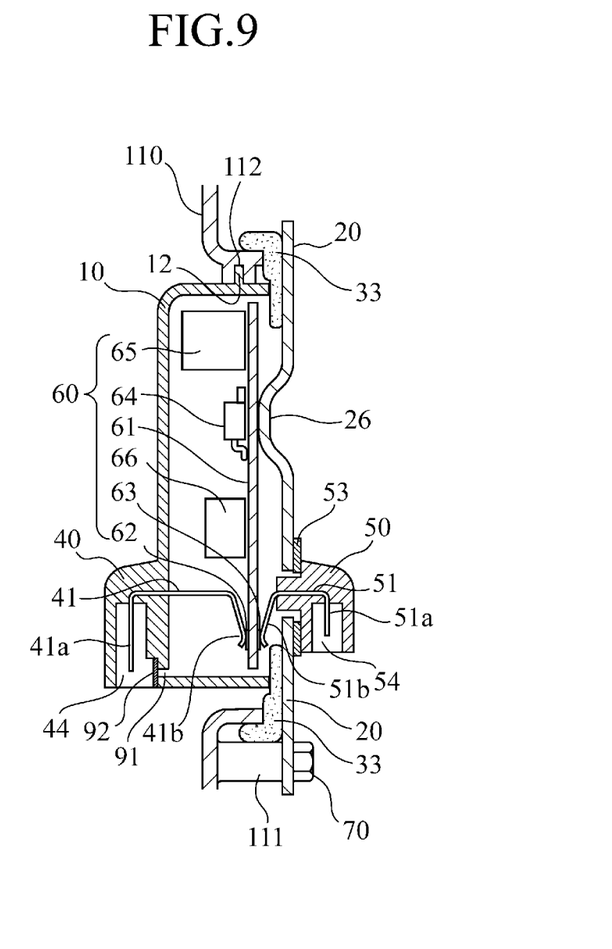
FIG. 9 is a partially cutaway view of a headlamp LED lighting device in accordance with Embodiment 3.

FIG. 9 is a partially cutaway longitudinal cross sectional view of the LED lighting device 1 in accordance with Embodiment 3. The same components as those in accordance with Embodiment 1 are designated by the same reference numerals, and the explanation of the components will be omitted hereafter. In the LED lighting device 1, a waterproof member 33 is disposed instead of the waterproof member 30 and the waterproof member 31, as shown in FIG. 9. The waterproof member 33 is formed in such a way as to have a larger size than each of the waterproof members 30 and 31, and the waterproof member 33 is disposed between a box 10 and a mounting plate 20, and between the mounting plate 20 and the headlamp case 110. By thus reducing the number of components, the number of processes of operation is reduced.

An air vent 91 is disposed in an opening 44 of a first connector 40. The air vent 91 is a hole for communicating the opening 44 with the inside of the box 10, and is formed in such a way that the internal pressure of the box 10, i.e. the LED lighting device 1 becomes equal to that of the headlamp case 110. Furthermore, an air vent is disposed in the headlamp case 110 in such a way as to produce no pressure difference between the internal pressure of the headlamp case and the external pressure outside the headlamp case, though not shown, and the internal pressure of the LED lighting device 1 becomes equal to the external pressure as a result. By thus preventing any pressure difference from occurring between the inside and outside of the LED lighting device 1, a permeation of water due to a pressure difference into the LED lighting device is prevented.

Furthermore, the air vent 91 is disposed in such a way as to lead to the lowest position in the box 10 of the LED lighting device 1. Because the air vent is constructed in this way, even though water permeates into the box 10 of the LED lighting device 1, the water can be flown out of the box.

As shown in FIG. 9, a permeable filter 92 can be disposed in the air vent 91. The moisture permeable filter 92 is a sheet which has fine holes or slits to allow vapor to pass therethrough, but does not allow water to pass therethrough, and which is disposed on a side of the opening 44. Because the permeable filter 92 is disposed, permeation of water into the LED lighting device 1 can be prevented even though water permeates into the headlamp case 110.

Furthermore, an air vent 91 and a permeable filter 92 can be disposed in a second connector 50.

As mentioned above, in accordance with Embodiment 3, permeation of water into the box 10 of the LED lighting device 1 is prevented, and failure occurring due to permeation of water can be avoided. As a result, there is provided an advantage of improving the reliability of the LED lighting device 1.

Although the structure in which engagement protruding portions 12 and engaging recesses 112 in accordance with Embodiment 1 mentioned above are engaged with each other is shown, the structure in accordance with Embodiment 2 can be alternatively adopted.

Industrial Applicability

As mentioned above, the LED lighting device in accordance with the present invention is constructed in such a way that the box is fitted into the opening in the rear portion of the headlamp case and is mounted to the headlamp case, the first connector for connecting to the LEDs is disposed on a side of the box, the side facing toward an inside of the headlamp case, and the second connector for connecting to the power supply is disposed on another side of the box, the other side facing toward an outside of the headlamp case. Therefore, because the LED lighting device can be accommodated in the headlamp case having the rear opening, and the headlamp case used for a halogen bulb can also be used as the one used for LEDs, the LED lighting device is suitable for use as a headlamp LED lighting device for vehicle use.

The invention claimed is:

1. A headlamp LED lighting device mounted to a rear opening of a headlamp case, comprising:
   a box that accommodates a circuit board on which a circuit that lights a headlamp LED is mounted, said box being fitted into and mounted to the rear opening of said headlamp case;
   a first connector disposed on a side of said box fitted into and mounted to said rear opening, the first connector connecting to said circuit board and supplying electric power to said headlamp LED, the side facing towards an inside of said headlamp case; and
   a second connector disposed on another side of said box fitted into and mounted to said rear opening, the second connector connecting to said circuit board and supplying electric power to said circuit board, said another side being opposite to the side on which the first connector is disposed and facing towards an outside of said headlamp case,
   wherein at least one of said first and second connectors has a contact terminal which is shaped in such a way as to have spring properties, and said contact terminal is pressed against an electrode formed on said circuit board in such a way as to be in contact with the electrode.

2. The headlamp LED lighting device according to claim 1, wherein said box has a mounting plate which is disposed on a surface thereof in such a way as to have a size larger than the rear opening of said headlamp case, and said mounting plate is secured in such a way that said box is fitted into the rear opening of said headlamp case and pressed against an open end of said rear opening.

3. The headlamp LED lighting device according to claim 2, wherein said box is provided with an engagement part which is locked to the rear opening of said headlamp case when said engagement part is fitted into the rear opening of said headlamp case and is then rotated.

4. The headlamp LED lighting device according to claim 3, wherein said engagement part is an engagement protruding portion formed on a peripheral portion of said box integrally with said box.

5. The headlamp LED lighting device according to claim 2, wherein said mounting plate has a protuberance that is in contact with a hot part of the circuit board to dissipate heat generated in said circuit board.

6. The headlamp LED lighting device according to claim 2, wherein a waterproof member is placed in a joint part between said mounting plate and said headlamp case.

7. The headlamp LED lighting device according to claim 2, wherein said second connector is mounted to said mounting plate, and a waterproof member is placed between said box and said mounting plate and a waterproof member is placed between said mounting plate and said second connector.

8. The headlamp LED lighting device according to claim 2, wherein an integrally-formed waterproof member is placed between said box and said mounting plate and between said mounting plate and said headlamp case.

9. The headlamp LED lighting device according to claim 1, wherein each of said first and second connectors has a contact terminal which is shaped in such a way as to have spring properties, and the contact terminals of said first and second connectors are pressed against opposite positions on electrodes formed on front and rear surfaces of said circuit board in such a way as to be in contact with the electrodes, respectively.

10. The headlamp LED lighting device according to claim 1, wherein an opening of at least one of said first and second connectors is formed in such a way as to face downwardly.

11. The headlamp LED lighting device according to claim 1, wherein an air vent for communicating an opening of at least one of said first and second connectors with an inside of said box is disposed.

12. A headlamp comprising:
a headlamp case having a rear opening and accommodating an LED as a light source of the headlamp; and
a lighting device lighting the LED and being disposed inside of the rear opening of the headlamp case, the lighting device including:
a box that accommodates a circuit board on which a circuit that lights the LED is mounted, said box being fitted into and mounted to the rear opening of said headlamp case;
a first connector disposed on a side of said box fitted into and mounted to said rear opening, the first connector connecting to said circuit board and supplying electric power to said LED, the side facing towards an inside of said headlamp case; and
a second connector disposed on another side of said box fitted into and mounted to said rear opening, the second connector connecting to said circuit board and supplying electric power to said circuit board, said another side being opposite to the side on which the first connector is disposed and facing towards an outside of said headlamp case,
wherein at least one of said first and second connectors has a contact terminal which is shaped in such a way as to have spring properties, and said contact terminal is pressed against an electrode formed on said circuit board in such a way as to be in contact with the electrode.

13. The headlamp according to claim 12, wherein said box has a mounting plate which is disposed on a surface thereof in such a way as to have a size larger than the rear opening of said headlamp case, and said mounting plate is secured in such a way that said box is fitted into the rear opening of said headlamp case and pressed against an open end of said rear opening.

14. The headlamp according to claim 13, wherein said box is provided with an engagement part which is locked to the rear opening of said headlamp case when said engagement part is fitted into the rear opening of said headlamp case and is then rotated.

15. The headlamp according to claim 13, wherein said mounting plate has a protuberance that is in contact with a hot part of the circuit board to dissipate heat generated in the circuit board.

16. The headlamp according to claim 13, wherein a waterproof member is placed in a joint part between said mounting plate and said headlamp case.

17. The headlamp according to claim 12, wherein each of said first and second connectors has a contact terminal which is shaped in such a way as to have spring properties, and the contact terminals of said first and second connectors are pressed against opposite positions on electrodes formed on front and rear surfaces of said circuit board in such a way as to be in contact with the electrodes, respectively.

* * * * *